Figure 1:
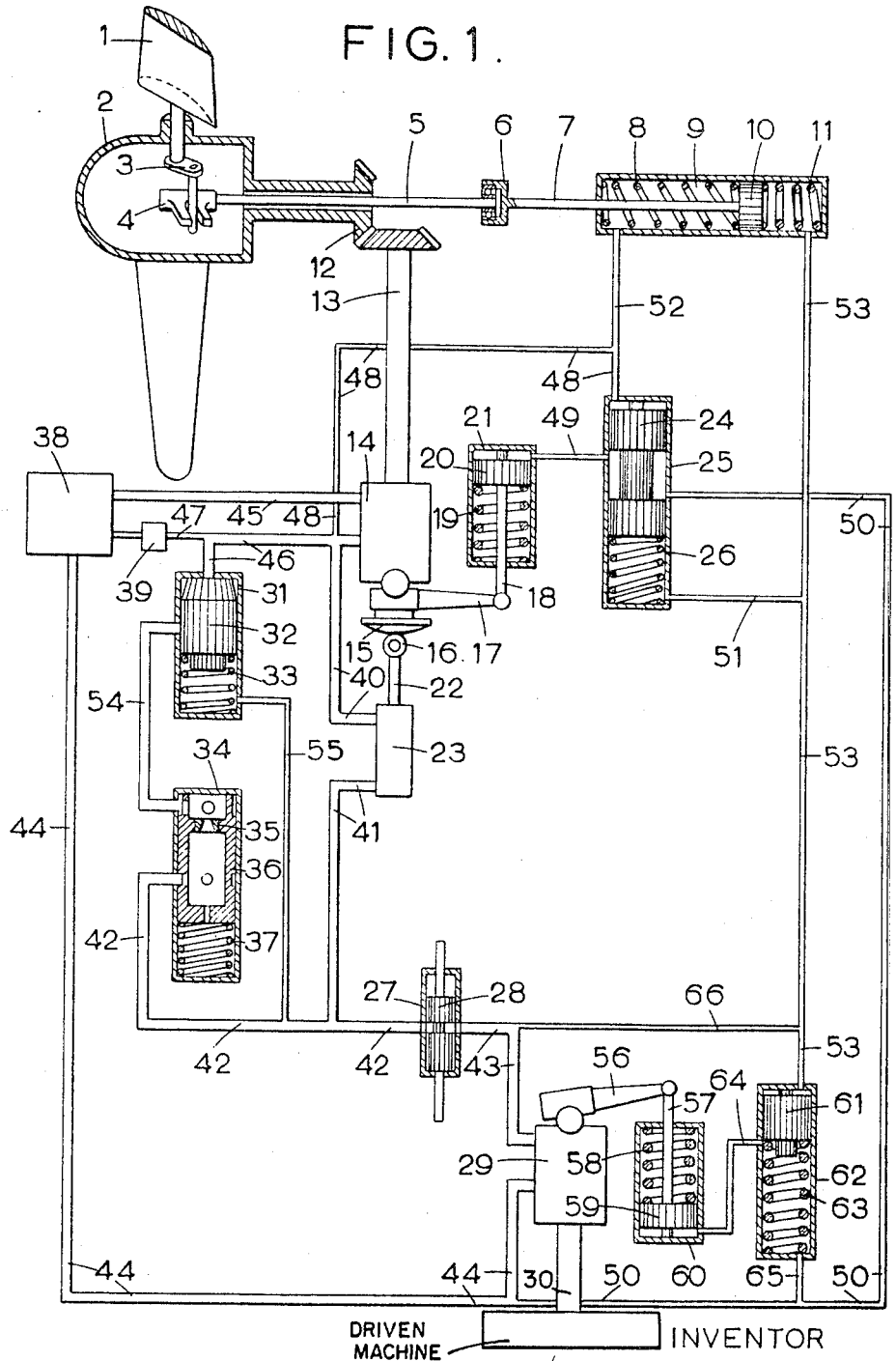

Aug. 30, 1966    L. BENING    3,269,121
WIND MOTOR

Filed Feb. 26, 1964    2 Sheets-Sheet 1

INVENTOR
BY Ludwig Bening
Morgan Finnegan, Durham and Pine,
ATTORNEYS.

Aug. 30, 1966

L. BENING 3,269,121

WIND MOTOR

Filed Feb. 26, 1964

2 Sheets-Sheet 2

FIG. 2.

__United States Patent Office__ 3,269,121
Patented August 30, 1966

3,269,121
WIND MOTOR
Ludwig Bening, Postfach 8, Barnstorf,
Bezirk Bremen, Germany
Filed Feb. 26, 1964, Ser. No. 347,481
8 Claims. (Cl. 60—52)

The invention relates to a wind motor. Wind motors which have a wind wheel incorporating two or more aerodynamic vanes capable of turning about their longidinal axis and mounted on a horizontal wind wheel shaft are known. The plane of the wind wheel may be turned into the wind automatically, for example, by a turbine or a vane operated by the wind. Wind motors of this kind are predominantly used for driving water pumps. Wind motors for generating electric power are likewise known, but the adjustment of the generator to the power delivered by the wind wheel involves difficulties. The known wind motors begin to function at a wind velocity of about 3 to 4 metres per second, and at a wind velocity of about 8 to 10 metres per second the vanes are turned about their longitudinal axis by a centrifugal governor in a manner such as to prevent further increase in the rotary speed of the wind wheel and thereby to prevent damage to it.

The power delivered by a wind wheel rises as the third power of the wind velocity and full utilisation of the wind energy would be ensured in the case of the known wind motors only when used to drive a machine whose power consumption likewise rises as the third power of the speed of rotation. There are only very few driven machines known that embody these features and they are not suitable for being driven by a wind motor because they require a minimum rotary speed to be able to function at all. At a wind velocity within the range of 2 to 12 metres per second the rotary speed is increased from 1 to 6 and the power output from 1 to 216. The efficiency factor of this type of machine over the whole range of its output is so low that it would not be economical.

To ensure a high degree of efficiency of wind motors the vanes must be carefully designed for an optimum shape. The initial efficiency of these vanes is however very poor, and they reach their maximum lift only when the wind wheel is turning at a particular speed. Starting aids are known to turn the vanes into a more favourable air inflow angle when the wind wheel is standing still. The turning is caused by the governor spring normally provided being compressed by a stronger spring. Once the wind wheel is turning this stronger pressure spring is compressed by means of a hydraulic piston operated by a hydraulic pump provided for this purpose alone, so that the vanes turn into their normal pitch and the governor spring can once more act. Such starting aids have the disadvantage that the separate hydraulic pump, which serves no other purpose, must be operated and impairs the efficiency of the wind motor as a whole. In addition the stopping of the wind wheel by turning the vanes so that the pitch is zero is not possible, nor it is possible to achieve a continuous regulation of the rate of rotation by means of a centrifugal governor.

As already noted the machines most frequently driven by wind motors are piston pumps for water supply systems, and generators for electric power. In the case of the piston pumps the output of the wind wheel is transmitted either through a rotating shaft or by a reciprocating linkage system. Thus, the pump is in mechanical connection with the wind motor and the distance between them depends on each other. Furthermore, at the lower wind velocities this wind motor with the connected piston pump works only at a particular water pressure and, if the water pressure rises above this, the installation comes to a standstill. In the case of driven governed generators, which give off electric current at a specific initial rate of rotation, the power output rises on an average by 10 times, whereas the rotary speed of the generator rises only by 1.2 to 1.5 times the initial value. The required torque which at the same time rises automatically by about 7 times cannot be efficiently produced by the wind wheel with such an insignificant increase in the rate of revolution so that the value of $u/V$ (rotation speed/wind velocity) at the fast speed at which the wind wheel develops its highest performance, is never reached.

It is an object of the present invention to obviate the disadvantages referred to above and thus to provide a wind motor which is capable of continuously transmitting the power output of the wind wheel as the third power of the increasing wind velocity to the driven machines, at a constant or variable torque, and which, disposing with an additional hydraulic pump, embodies a starting aid with switching-off means and a device for regulating the rotary speed of the wind wheel; the power produced by the new machine is not transmitted mechanically so that it is independent of the location of the driven machine, and the fast speed $u/v$ of the wind wheel is kept constant within the limits of the useful wind velocity irrespective of the torque of the driven machine.

The wind motor of the invention comprises a hydraulic pump which is driven by the wind wheel and is preferably infinitely variable; the hydraulic liquid delivered by it first flows through a calibrating valve to the driven machine, which is advantageously designed as an infinitely variable hydraulic motor, and is then returned under atmospheric pressure to a tank. The hydraulic pump is governed by a differential pressure valve, while the driven machine is governed via a pressure controlled valve by means of a hydraulic pressure cylinder. The calibrating valve is connected through a governor cam with the variable hydraulic pump in a manner such that, based on the wind wheel output, the volume of the variable pump is controlled as the square, and at the same time the amount delivered by the calibrating valve is controlled as the third power, proportional to the velocity of the inflowing wind and at a constant working pressure. In parallel with the calibrating valve there is provided a flow limiting valve which, after the hydraulic pump has been finally adjusted, is additionally switched by a differential pressure valve into the oil supply duct to the driven machine to ensure a linear utilisation of the further rising wind velocity by way of an increased supply of hydraulic oil to the driven machine. A hydraulic cylinder, which incorporates a piston with working faces of different size, of which the larger face is acted upon by the pressure between machine and cut-out valve, whereas the smaller face is acted upon by the differential pressure in front of the calibrating valve, said piston thus being in a non-positive connection with the vanes, ensures that when the wind wheel comes to a standstill two pressure springs position the piston so as to produce the optimum starting position of the vanes; it ensures further that when a predetermined wind velocity is exceeded the rate of rotation remains constant up to the highest possible wind velocity; and it ensures further that when a valve is actuated to cut off the supply of hydraulic oil to the driven machine the wind wheel immediately comes to a standstill and if the oil pipe should break or the oil level in the tank drops below a certain minimum the vanes are turned into the starting position, whereby the wind motor is substantially caused to cease working.

One construction of wind motor according to the invention is shown as an example in FIGURE 1 of the accompanying drawings, which further include in FIGURE 2 power graphs of wind motors, namely:

(I) A power graph of a wind motor according to the invention, (II) A power graph of a wind motor of the conventional type.

The wind motor illustrated in FIGURE 1 is represented in its starting position. As illustrated in graph I of FIGURE 2, the motor should start working, for example, at a wind velocity of 3 metres per second; at a wind velocity of 7 metres per second the regulation of the torque of the infinitely variable hydraulic pump is complete and the linear regulation sets in; when the wind velocity rises above 12 metres per second the wind wheel is subjected to a constant regulation of its rotary speed up to the maximum wind velocity.

When there is no wind blowing there is no pressure acting in the hydraulic system and the forces of the two pressure springs 9 and 11 in the vane regulating or control cylinder 8 are nil, or cancel each other out, and this constitutes the starting position of the vanes 1; the variable hydraulic pump 14 is adjusted by means of the pressure spring 19 in the pump actuating cylinder 21 via the piston rod 18 and the lever 17 in a manner such that $$\frac{\text{oil delivery volume} \times \text{pressure}}{\text{time}}$$

is equal to the performance of the wind wheel 2 at 3 metres per second wind velocity. At the same time the calibrating valve 23 has been automatically set by the control cam 15 via the roll 16 and the pushrod 22 in a manner such that the amount of oil delivered by the variable hydraulic pump 14 can flow through under a usual differential pressure. At a wind velocity of 3 metres per second the wind wheel 2 starts moving, the variable hydraulic pump 14 supplies oil from oil tank 38 through conduit 45 to the hydraulic system so that the piston 10 is pushed to the left by reason of its unequal working faces, the vanes 1 are placed by piston rod 7, thrust bearing 6, pushrod 5, fork 4 and lever 3 into their optimum pitch and the wind wheel 2 is thereby caused to rotate faster. When the pressure within the hydraulic system reaches the working pressure level, the control slide 61 of the differential pressure control valve 62 is pushed downwards against the spring 63 sufficiently to close the duct 64, and the variable hydraulic motor 29 —which is still being held by the spring 58 via the piston rod 57 and the lever 56 at its lowest torque—is caused to revolve. When the torque of the driven machine 70 connected via the shaft 30 is greater than the torque of the hydraulic motor 29 held in this position, the wind motor remains inoperative and this raises automatically the pressure inside the hydraulic system. The control slide 61 is further pushed downwards out of its median position by the fluid pressure until the pressure oil can flow from the duct 53 through 64 into the motor control cylinder 60; the piston 59 moves upwardly and sets the hydraulic motor 29 via piston rod 57 and lever 56 for a higher torque until the torque of the driven machine 70 is overcome. The oil motor is running and the piston 61 returns to its median position, and in this manner the control position of the hydraulic motor 29 is fixed. When the torque of the now running driven machine drops, the normal working pressure is automatically reduced, whereby the spring 63 pushes the piston 61 up, and the hydraulic oil acting on the piston 59 can flow off through duct 64. The piston 59 moves downwards and by means of the piston rod 57 and the lever 56 it brings the torque of the hydraulic motor 29 in line with the torque of the running driven machine, whereby the normal working pressure is restored and the piston 61 returns to its median position and holds the piston 59 in position. When the amount of oil delivered by the variable hydraulic pump 14 exceeds the amount of flowing oil adjusted by means of the calibrating valve 23—either because of a higher rotary speed of the wind wheel 2 or because the wind velocity has increased—the excess oil supplied to the calibrating valve 23 generates in the ducts 40, 46, 47, 48 and 52 a pressure. Check valve 39, in duct 47 prevents oil from returning to tank 38 so as to permit a pressure build-up in duct 47. The build-up of an increased differential pressure within the ducts mentioned, as compared with the pressure in ducts 41, 42, 43, 66, 53 and 51 past the calibrating valve 23, continues until the resistance of the pressure spring 26 in the differential pressure control valve 25 has been overcome, where upon the control slide 24 moves downwards and produces a hydraulic connection between the ducts 48 and 49; pressure acts on the piston 20 of the pump actuating cylinder 21 and pushes it downwards against the pressure spring 19 and readjusts the hydraulic pump 14 through piston rod 18 and lever 17 to a larger volume of delivery as the square proportional to the increased wind velocity; at the same time the control cam 15 via roll 16 and pushrod 22 increases automatically the amount of oil flowing through the calibrating valve 23 as the third power, proportional to the increased wind velocity. The readjustment continues until the delivery of the variable hydraulic pump 14, as a function of the rotary speed of the wind wheel 2 and of the wind velocity, ($u/v$) again flows under normal differential pressure through the calibrating valve 23 which is automatically governed by the control cam 15, depending on the number of revolutions of the wind wheel and thereby on the delivery of the hydraulic pump 14. The pressure spring 26 is so dimensioned that, when the differential pressure is at its normal value, the control slide 24 shuts off the control duct 49, whereby any further adjustment of the hydraulic pump 14 and of the calibrating valve 23 is prevented. When the wind velocity increases further, the whole cycle is repeated until the final setting of the infinitely variable hydraulic pump 14 and of the calibrating valve 23 is reached. According to the example this final setting is reached at a wind velocity of 7 metres per second. If the wind velocity continues to increase and exceeds 7 metres per second the delivery of the hydraulic pump 14 increases proportionately owing to the higher rotary speed of the wind wheel, but the amount of oil flowing through the calibrating valve 23 is limited by the final setting to the amount delivered at a wind velocity of 7 metres per second, so that there occurs a pressure build-up beyond the normal differential pressure in the ducts 40, 46, 47, 48 and 52. This excess pressure build-up pushes the control slide 24 into its lower dead center position in valve 26, the ducts 48 and 49 are in communication, and the pressure acts on the piston 20 in cylinder 21 (which had already been in its lower dead center position) and thereby ensures the maintenance of the maximum delivery setting of the hydraulic pump 14 by means of the calibrating valve 23. When the pressure build-up has overcome the resistance of the pressure spring 33 in the differential pressure control valve 31 (which is somewhat stronger than the pressure spring 26), the control slide 32 is pushed downwards, whereby a hydraulic connection is made between the working duct 46 and duct 54. The increased amount of oil delivered by the hydraulic pump 14 (which is now in its terminal setting) due to the higher rotary speed of the wind wheel 2 at a wind velocity above 7 metres, which increased amount exceeds the limit allowed by the calibrating valve 23 to pass, flows through the duct 54 and the limiting valve 34 additionally through the working duct 42 into the hydraulic motor 29. Thus, the differential pressure valve 31 and limiting valve 34 are connected in parallel relationship with the calibrating valve 23, the control slide 32 of the valve 31 having its spring-loaded face in hydraulic connection with the downstream side of the calibrating valve through duct 55, the other face of control slide 32 being in hydraulic connection with the upstream 5 of calibrating valve 23 through ducts 46 and 40. The metering diaphragm 35 of the limiting valve 34 is dimensioned so that the limiting valve 34 allows the linear increase of the amount delivered by the hydraulic pump 14, proportional to the increased rotary speed of the wind wheel 2, caused by increasing wind velocities from 7 to 12 meteres per second, to pass under a normal differential pressure, while it does not allow to pass the increased amount due to wind velocities above 12 metres per second, and in this way a pressure build-up occurs in the ducts 54, 46, 47, 40, 48, 49 and 52; whenever the pressure build-up becomes greater than the force of the pressure before the largest working face of the piston 10 of the vane control cylinder 8 (on which the working pressure acts through duct 53), the piston 10 is pushed to the right so that the vanes are given by piston rod 7, thrust bearing 6, pushrod 5, fork 4 and lever 3 a greater pitch and the rotary speed of the wind wheel 2 drops and then remains constant when the additional linear delivery of the hydraulic pump 14 is identical with the amount flowing through the limiting valve 34. The wind motor installation then continues to work at a constant rotary speed of the wind wheel 2 at all wind velocities beyond 12 metres per second. When the wind velocity drops, for example to 7 metres per second, the wind wheel 2 is forced to turn more slowly, the excess pressure in the ducts 52, 48, 46, 47, 54 and 40 drops until it has reached the level of the normal working pressure, and pistons and valves now work thus: At first, the piston 10 moves to the left into its left-hand terminal position, since the force of the working pressure (which acts through duct 53 on the largest working face of the piston 10) has now increased again; the control slide 32 is returned by the pressure spring 33 to its top dead center position in valve 31 and thereby interrupts the hydraulic connection between ducts 46 and 54 so that the limiting valve 34 is cut out; the control slide 24 moves upwards into its median position in valve 25 and thereby interrupts the hydraulic connection between ducts 48 and 49; the piston 20 remains stationary in its bottom position in cylinder 21, and the variable hydraulic pump 14 as well as the calibrating valve 23 remain in their extreme control position. When the wind velocity drops further (whereby the rotary speed of the wind wheel 2 is reduced again), the delivery of the hydraulic pump 14 no longer corresponds to the amount passed by the calibrating valve 23 and as a result the necessary normal differential pressure in the ducts 40, 46, 47, 48 and 52 drops so that the spring 26 presses the control slide 24 into its upper position in valve 25, a hydraulic communication is produced between ducts 49 and 50 and the oil above the piston 20, which held it in position, can now flow under atmospheric pressure through ducts 49, 50 and 44 into the oil tank 38. The piston 20 now moves upwards and resets by means of piston rod 18 and lever 17 the hydraulic pump 14 and the calibrating valve 23 for a smaller amount of delivery and flow-through respectively, the necessary thrust being provided by the pressure spring 19. As soon as the delivery of the variable hydraulic pump 14 has been brought once more in line with the flow through the calibrating valve 23 and the reduced rotary speed of the wind wheel 2, the restored normal differential pressure causes the control slide 24 to take up its median position in valve 25 so that the hydraulic connection between ducts 49 and 50 is interrupted and the piston 20 is arrested, and the torque of the hydraulic pump 14 has adapted itself again to the torque of the wind wheel 2. This cycle is repeated until the wind velocity has dropped below 3 metres per second, the wind wheel 2 stands still, the pressure from the hydraulic system is released, the pressure springs 9 and 11 displace the piston 10 until their forces cancel each other out or become nil, and in this manner the vanes 1 are caused by elements 7, 6, 5, 4 and 3 to take up their starting position, as shown in the accompanying drawings.

To bring the installation to a standstill, a cut-off valve 27 is provided. For example: The installation works at a wind velocity of about 5 metres per second; the locking slide 28 of the cut-off valve 27 is pushed up (manually or automatically) to block the working duct 42 and in the whole hydraulic system—except in the ducts, and the spaces connected with them, 53, 51, 50, 64, 65, 66, 43, 44 and 45—excess pressure builds up and pushes the control slide 24 into its bottom position in valve 25. This produces a hydraulic connection between ducts 48 and 49 which causes the piston 20 to move against the pressure of spring 19 into its bottom dead centre position, whereby through the piston rod 18 and the lever 17 the variable hydraulic pump 14 is automatically set for maximum delivery and the calibrating valve 23 is set by the control cam 15, the roll 16 and the pushrod 22 for maximum flowthrough so that the wind wheel 2 has to overcome the maximum torque of the hydraulic pump 14 transmitted by the working shaft 13 and the angle drive 12; at the same time the piston 10 of the vane control cylinder 8 moves against the resistance of the pressure spring 11 into its right-hand terminal position in which the vanes 1 are in non-positive connection with the piston 10 through lever 3, fork 4, pushrod 5, thrust bearing 6 and piston rod 7 (so that the pitch of the vanes 1 corresponding to $u/v=0$) and this brings the wind wheel 2 to a standstill. When the locking slide 28 is then opened again, the pressure is released from the whole hydraulic system and all control and setting devices are returned by the pressure springs to their initial positions as shown in the drawing. In case an oil pipe should burst during operation, or should a leak cause the oil to run out of the tank, the installation will not rotate and is not damaged even in a storm because, as soon as the pressure is released from the hydraulic system, the vanes 1 are returned by the pressure springs 9 and 11 into the starting position, and the pitch is about $u/v=0.5$ to 1.

By providing the additional linear increase in performance by way of the parallel calibrating valve, by the valves operated by the differential pressure, and by the automatic torque control of the variably driven machine, depending on the driven machine, the invention makes it possible to manufacture a wind motor which facilitates the prevailing wind velocity to be utilised continuously for driving all kinds of machines at an equal or unequal torque.

It will be understood that a variable hydraulic pump or motor as referred to herein includes a pump or motor variable by association with a variable gear, rather than in itself.

I claim:
1. A wind motor comprising a wind wheel, a variable hydraulic pump driven by said wind wheel and producing a flow of hydraulic fluid, a variable hydraulic motor driven by said flow of hydraulic fluid, a calibrating valve for said hydraulic fluid situated between said pump and said motor, a reservoir for said hydraulic fluid, ducts for said hydraulic fluid from said pump to said calibrating valve, from said calibrating valve to said motor, from said motor to said reservoir, and from said reservoir to said pump, and means for controlling said pump and said calibrating valve such that the delivery volume of said pump varies approximately as the square of the velocity of the wind driving said wind wheel and the amount of fluid flowing through said calibrating valve varies approximately as the cube of said velocity.

2. A wind motor according to claim 1 including a delivery limiting valve for the hydraulic fluid, a first differential pressure controlled valve, a duct for said fluid connecting said first differential pressure valve and said delivery limiting valve, said differential pressure valve controlling said delivery limiting valve, and ducts for said fluid connecting said first differential pressure valve to said pump and said delivery limiting valve to said motor so that said first differential pressure valve and said delivery limiting valve are in parallel with said calibrating valve, one side of said first differential pressure valve being spring-loaded and in hydraulic connection with the downstream side of said calibrating valve, and the other side of said differential pressure controlled valve being in hydraulic connection with the upstream side of said calibrating valve.

3. A wind motor according to claim 1 wherein said wind wheel comprises at least two aerodynamic vanes which are adapted to be turned about their longitudinal axis and are secured to a horizontal wind wheel shaft including wind operated means for automatically turning the plane of said wind wheel into the wind and control cam means connecting said wind wheel in non-positive connection with said variable hydraulic pump and said calibrating valve whereby the delivery volume of said variable hydraulic pump is proportional to the square of the wind velocity and the amount of fluid flowing through said calibrating valve is proportional to the third power of the wind velocity.

4. A wind motor as claimed in claim 1 including a delivery limiting valve arranged in parallel with said calibrating valve and actuated by a first differential pressure controlled valve, said first differential pressure valve including a control slide having a first spring-loaded working face and a second working face, the pressure downstream of said calibrating valve acting on said spring-loaded work face of said control slide of said first differential pressure valve and the pressure upstream of said calibrating valve acting on said second working face of said control slide of said differential pressure valve.

5. A wind motor as claimed in claim 1 including a vane control cylinder having a piston mounted therein with working faces of unequal size, the larger working face of said vane control cylinder piston being acted upon by hydraulic fluid pressure downstream of said calibrating valve, and the smaller working face of said vane control cylinder piston being acted upon by hydraulic fluid pressure upstream of said calibrating valve, said vane control cylinder further including two opposed loading springs for moving said piston when there is no pressure in the hydraulic system, said opposed loading springs adapted to normally position said wind wheel for start-up, whereby said vane control cylinder operates to start or stop said wind motor, to control the rotary speed thereof, and to prevent damage to said wind motor when the hydraulic fluid supply ceases.

6. A wind motor as claimed in claim 5 including a spring-loaded piston cylinder for actuating said pump, a second differential pressure controlled valve, said second differential pressure valve including a control slide having a first spring-loaded working face and a second working face, a main duct for said fluid between said calibrating valve and said hydraulic motor, and another main duct between said pump and said calibrating valve, said spring-loaded working face of said control slide of said second differential pressure valve being in hydraulic connection with the larger working face of said piston in said vane control cylinder and with said main duct between said calibrating valve and said hydraulic motor, and said second working face of said control slide of said second differential pressure valve being in hydraulic connection with the smaller working face of said piston in said vane control cylinder and with said main duct between said pump and said calibrating valve, whereby a change in pressure of said calibrating valve causes the hydraulic fluid to actuate the piston of the pump actuating cylinder through said second differential pressure valve.

7. A wind motor as claimed in claim 1 wherein said motor is adapted to drive a driven machine, said motor being governed automatically through a motor control cylinder and a third differential pressure controlled valve, said motor control cylinder and said third differential pressure valve controlling the torque developed by said motor to that required by said driven machine.

8. A wind motor as claimed in claim 7, including a hydraulic connection between said third differential pressure valve and said motor control cylinder, and a further hydraulic connection between said third differential pressure valve and the main downstream side of said motor, and wherein said third differential pressure valve includes a control slide having a first spring-loaded working face and a second working face, the loading spring for said first working face of said control slide of said third differential pressure valve dimensioned so that said spring positions said control slide in its median position when the torque developed by said motor and the torque required by said driven machine are identical, whereby the control slide shuts off said hydraulic connection from said third differential pressure valve to said motor control cylinder, whereas when the torque of said driven machine is greater than that of said motor the fluid pressure acts on said second working face of said control slide of said third differential pressure valve so as to move said control slide out of said median position whereby the hydraulic connection is between said third differential pressure valve and the main downstream side of said motor.

References Cited by the Examiner

UNITED STATES PATENTS

| | | | |
|---|---|---|---|
| 2,238,061 | 4/1941 | Kendrick | 60—52 |
| 2,539,862 | 1/1951 | Rushing | 103—11 |
| 2,888,810 | 6/1959 | Ham | 103—162 |
| 2,892,312 | 6/1959 | Allen et al. | 60—52 |
| 3,003,262 | 10/1961 | DeBiasi | 60—52 |
| 3,125,960 | 3/1964 | Chilman | 170—160.14 |

MARK NEWMAN, *Primary Examiner.*

SAMUEL LEVINE, *Examiner.*

W. L. FREEH, *Assistant Examiner.*